United States Patent
Günther et al.

(10) Patent No.: US 10,971,962 B2
(45) Date of Patent: Apr. 6, 2021

(54) STATOR WITH A WINDING INTERCONNECTION AND METHOD OF MAKING SAME

(71) Applicant: Bühler Motor GmbH, Nuremberg (DE)

(72) Inventors: Heinz Günther, Oberasbach (DE); Reiner Hettych, Nuremberg (DE); Martin Gundermann, Nuremberg (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 35 days.

(21) Appl. No.: 16/276,010

(22) Filed: Feb. 14, 2019

(65) Prior Publication Data

US 2019/0260256 A1    Aug. 22, 2019

(30) Foreign Application Priority Data

Feb. 16, 2018    (DE) ...................... 10 2018 202 408.1

(51) Int. Cl.
*H02K 3/38* (2006.01)
*H02K 3/52* (2006.01)
(Continued)

(52) U.S. Cl.
CPC ............... *H02K 3/38* (2013.01); *H02K 3/522* (2013.01); *H02K 15/0062* (2013.01);
(Continued)

(58) Field of Classification Search
CPC ............ H02K 3/38; H02K 3/50; H02K 3/522; H02K 2203/09; H02K 2203/12
(Continued)

(56) References Cited

U.S. PATENT DOCUMENTS

2005/0189828 A1*  9/2005  Nakayama ............ H02K 3/522
                                                                   310/71
2014/0191598 A1*  7/2014  Winheim ............ H01R 12/675
                                                                   310/71
(Continued)

FOREIGN PATENT DOCUMENTS

CN          105322686 A      2/2016
DE    10 2017 202 860 A1     8/2017
(Continued)

OTHER PUBLICATIONS

Machine translation of JP-2017085756-A. (Year: 2017).*
Search Report dated Dec. 11, 2018, issued in counterpart German Patent Application No. 10 2018 202 408.1 (5 pages).

*Primary Examiner* — Michael Andrews
(74) *Attorney, Agent, or Firm* — Westerman, Hattori, Daniels & Adrian, LLP

(57) ABSTRACT

A stator of an electronically-commutated DC motor, with a stator core, an insulating cap, a stator winding, and a winding interconnection, wherein the winding interconnection consists of several sheet-metal elements and several insulating elements which are arranged between the sheet-metal elements. The aim of the invention is to provide a simple design for a generic stator consisting of easy-to-manufacture and easily-shaped components, wherein production tolerances can be compensated for in a simple manner. A further aim consists of being able to use reliable and proven production processes which are also as easy as possible to monitor.

23 Claims, 3 Drawing Sheets

(51) Int. Cl.
*H02K 15/00* (2006.01)
*H02K 15/10* (2006.01)

(52) U.S. Cl.
CPC ....... *H02K 15/105* (2013.01); *H02K 2203/09* (2013.01); *H02K 2203/12* (2013.01)

(58) Field of Classification Search
USPC .......................................................... 310/71
See application file for complete search history.

(56) References Cited

U.S. PATENT DOCUMENTS

2016/0013691 A1    1/2016  Houzumi et al.
2016/0190886 A1*  6/2016  Okamoto ........... H02K 11/0094
                                                                             310/71
2016/0301276 A1  10/2016  Saki et al.

FOREIGN PATENT DOCUMENTS

JP         2017-85756 A     5/2017
JP         2017085756 A  *  5/2017

* cited by examiner

STATOR WITH A WINDING INTERCONNECTION AND METHOD OF MAKING SAME

CROSS-REFERENCE TO RELATED APPLICATIONS

The present patent application claims priority from German Application No. DE 10 2018 202 408.1, filed on Feb. 16, 2018, and which is incorporated herein by reference in entirety.

BACKGROUND OF THE INVENTION

(1) Field of the Invention

The invention relates to a stator of an electronically-commutated DC motor, with a stator core, an insulating cap, a stator winding, and a winding interconnection, wherein the winding interconnection consists of several sheet-metal elements and several insulating elements which are arranged between the sheet-metal elements.

(2) Description of Related Art Including Information Disclosed Under 37 CFR 1.97 and 1.98

A plurality of winding interconnections for stator windings are known in which sheet-metal elements are used as a conductor and contact element. Generally, these sheet-metal elements have insulating coatings in order to avoid short circuits between several sheet-metal elements, or they are accommodated in seating grooves separated from one another. These sheet-metal elements are often over-molded in order to obtain a compact structural unit. Inaccuracies of the sheet-metal elements can lead to difficulties when inserting sheet-metal elements into seating grooves. In these embodiments, the sheet-metal elements are often curved annularly and arranged concentrically. Such winding interconnections require involved tooling and manufacturing.

BRIEF SUMMARY OF THE INVENTION

The aim of the invention is therefore to provide a simple design for a generic stator consisting of easy-to-manufacture and easily shaped components, wherein production tolerances can be compensated for in a simple manner. A further aim consists of being able to use reliable and proven production processes that are as easy as possible to monitor.

Since the sheet-metal elements and the insulating elements are affixed to the insulating cap by a holder, reliable mounting and play-free retention of the loosely-stacked sheet-metal elements and the insulating elements placed between them are possible. The winding interconnection is accommodated in a seating area, which is bordered by the insulating cap and the holder. In this way, the winding interconnection can be securely accommodated, both radially and axially. The holder serves primarily for axially fixing the winding interconnection, while the insulating cap forms both an axial and a radial seat.

In order to provide better centering of the sheet-metal elements, they have centering sections that adjoin a part bordering the seating area. This can be the insulating cap or the holder. The sheet-metal elements should preferably adjoin the insulating cap radially to the outside. Supporting the sheet-metal elements on the holder is possible both radially to the inside and radially to the outside. At least the centering elements of a sheet-metal element, in particular, the insulating cap, are supported axially in the seating area. Axial guides are, preferably, provided on the insulating cap, which accommodates the centering sections.

For positionally correct installation, out of the three centering sections per sheet-metal element, one centering section is formed with a smaller width than the others. Furthermore, one guide of a plurality of guides is designed to be narrower than the other guides. As a result, a single sheet-metal lamella can, for example, be installed only in three of nine possible angular positions. An assembly consisting of three identical sheet-metal lamella, which sheet-metal lamella are always arranged offset from each other by a one-ninth angular division, could then be installed only in a specific position.

In a further development of the invention, the insulating cap has wire-deflecting means on axially projecting regions. These allow the winding wire to be used sectionally as a contact and to guide it specifically to peripheral regions where contact with the winding is easily accessible and can be easily checked. The wire-deflecting means are preferably designed in the shape of a drop. This optimally adapts them to the path of the wire and the geometry of a winding groove. In addition, the wire-deflecting means thus have a greater strength. The winding wires can be guided tangentially on the insulating cap.

Furthermore, the insulating cap has connectors, also referred to as connecting means, for connection to the holder. These connecting means are preferably arranged at three locations evenly distributed around the circumference of the insulating cap. The connecting means are configured as a pin and extend axially from the insulating cap.

To enable compensation for axial play, the holder must be able to dip axially into the insulating cap. Therefore, the holder has extension arms that extend radially and can be mechanically affixed at their ends to connecting means. The holder has three extension arms that are angularly offset by 120° such that it can be installed when rotated by 120° or 240°. The holder and the insulating cap are dimensioned such that an axial play exists between the connecting means and the extension arms under all tolerance conditions. As a result, the sandwich arrangement consisting of the insulating cap, sheet-metal elements, insulating elements, and the holder is always free of play. The extension arms are axially offset from an annular region of the holder.

Usefully, the extension arms have either a cutout that is open radially to the outside or a passage that is closed to the outside. These correspond to the connecting means of the insulating cap. In principle, male and female connecting means can also be provided on the other component. However, for installation reasons, the described solution is preferred. It is, in particular, easier to shape a projecting pin or comparable projections by hot caulking than a pin engaging in a recess.

To make contact as easy and reliable as possible, there is a clear gap between the wire-deflecting means in the projecting region of the insulating gap, the gap being bridged by a freely-laid winding wire section. The gap is, in particular, for applying welding tongs to a contact hook and creating a welded connection between a winding wire section and the contact hook.

The sheet-metal rings are, expediently, integral with the contact hooks. The contact hooks are aligned in such a way that they catch winding wire sections of the stator winding during assembly, while the sheet-metal rings execute an axial movement in the direction of the insulating cap during assembly.

In order to obtain a secure mechanical and electrical connection between a winding wire section and a contact hook, the two elements are welded together. In special cases, two legs of the contact hooks could additionally be welded together in the region of a gap.

The sheet-metal elements can be open or closed rings, each of which has a contact section for connecting to a voltage supply. Closed sheet-metal elements are more dimensionally stable, but generally cause more punch waste during punching. Open conductor arcs can, by skillful arrangement, be stamped out of the sheet-metal blank in a space-saving and thus material-saving manner.

To ensure that the sheet-metal elements are reliably electrically insulated from one another, the insulating elements are designed to be wider than the sheet-metal elements so that they protrude radially on both sides. Creepage distances are thereby lengthened.

The insulating elements can be coated with an adhesive layer on two opposing surfaces or be adhesive-free. Depending upon the selected design, different manufacturing steps are required. A heat-activatable adhesive is preferred as the adhesive, because it permits a more reliable assembly.

As mentioned, the holder dips into the seating area until there is no play between the holder, the sheet-metal elements, the insulating elements, and the insulating cap. The extension arms can then be pressed onto the insulating cap and fixed in this position by means of hot caulking. As a result, the sheet-metal elements with the insulating elements remain under mechanical stress in an axial direction.

In order to ensure defined conditions, in the insulating cap, axial stops are provided, on which at least one sheet-metal element, in particular with its centering sections, is axially supported. The remaining sheet-metal elements are accommodated in the sandwich between the first sheet-metal element, the insulating elements, and the holder in an axially-defined manner.

It is further provided that the centering sections be joined in axial guides of the insulating cap. The guides ensure a lock against rotation and a specific angular position assignment. For the contacting process, several recesses are provided on the holder. These are assigned to the contact hooks. This facilitates accessibility for a tool, in particular a welding tool. Further, the recesses have inclined surfaces in the direction of the contact hooks.

Moreover, it is proposed that the welding points of several, preferably all contact hooks of one phase of the motor, be arranged axially at the same axial position. This simplifies the assembly process and the tools necessary for this. The winding wire sections of different phases of the stator are adapted to the different axial positions of the sheet-metal elements. This facilitates the use of identical parts for the sheet-metal elements.

In a further development of the invention, the holder has an inner bead on its inner side. As a result, the sheet-metal elements and the insulating elements are better protected against contamination and damage. The inner bead is preferably designed as an annular wall. Leakage currents are thereby minimized (DIN EN 60335-1). During pre-assembly, the inner bead can pre-center the sheet-metal elements and the insulating elements.

An advantage of the invention is also that many identical parts are used. The sheet-metal elements are accordingly of identical design. The same applies to the insulating elements.

Of interest is a method of making the stator. In a first method, the following steps are carried out: a) providing the stator core furnished with the insulating cap and a winding, wherein winding wire sections are arranged on the circumference of the insulating cap that bridge the gaps; b) providing sheet-metal elements, insulating elements, and a holder; c) alternatingly inserting sheet-metal elements and insulating elements coated with thermosetting adhesive into a device; d) compressing, heating, and adhering the thus-formed stack, whereby an interconnection assembly is produced; e) joining the interconnection assembly and a holder on the insulating cap; f) pressing the holder onto the insulating cap; g) reshaping connecting means to form a mechanical connection between the insulating cap and the holder; and h) producing an electrical contact between each contact hook and the associated winding wire sections.

An alternative method is, however, preferred, in which a pre-assembly of some components to form a compact assembly takes place as follows: a) providing the stator core furnished with the insulating cap and a winding, wherein gaps are arranged on the circumference of the insulating cap that bridge winding wire sections; b) providing the sheet-metal elements, the insulation elements, and a holder; c) alternatingly inserting sheet-metal elements and insulating elements into the holder, wherein rivet pins of the holder are inserted into through-holes of the sheet-metal elements and of the insulation elements; d) hot caulking the rivet pins to form an assembly as a winding interconnection; e) axially mounting the assembly on the stator—in particular, on the insulating cap, wherein recesses or passages of the holder are joined to connecting means of the insulating cap; f) producing a form-fit connection between the recesses or passages of the holder with connecting means of the insulating cap by hot caulking the connecting means; and g) producing an electrical contact between each contact hook and the associated winding wire sections.

A welded joint is preferable for the production of electrical contact between the contact hook and the winding wire sections. Especially suitable for this purpose is resistance welding or laser welding. The welding points and also the welded winding wire sections are no longer stressed by the holder during operation, and oscillations are minimized. This prevents cable breakage or breakage of the welding points.

BRIEF DESCRIPTION OF THE SEVERAL VIEWS OF THE DRAWINGS

The exemplary embodiments of the invention are explained in more detail below, based upon the drawing. Shown are.

DETAILED DESCRIPTION OF THE INVENTION

Figure 1:
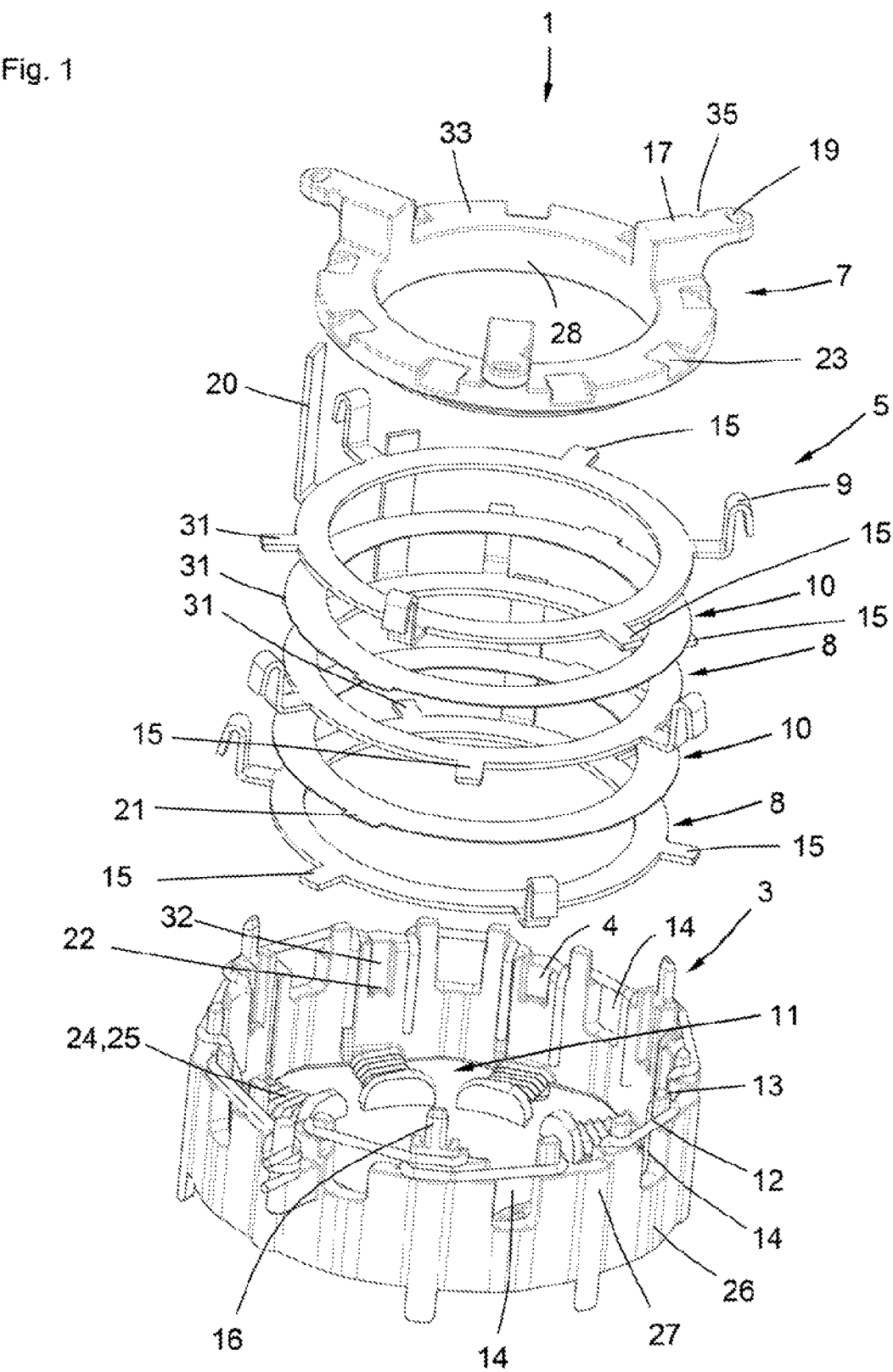
FIG. 1 is an exploded view of a stator winding interconnection.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows an exploded view of a partial stator 1 of an electric motor with a winding interconnection 5 of an insulating cap 3, three sheet-metal elements 8, two insulating elements 10, and one holder 7. In a general approximation, the insulating cap 3 is composed of a tubular and an annular disk-shaped region 24, wherein the annular disk-shaped region consists of several pole covers 25 that extend radially to the inside and which transition radially to the outside into the tubular region 26. The tubular region 26 of the insulating cap 3 consists of a first tube section closed around the entire circumference and an axially-adjacent tube section 27 that is perforated radially several times from which wire-deflecting means 13 project axially. Winding wire sections 12 run around the wire-deflecting means 13; these bridge gaps 14 between the perforated tube sections 27. Also formed in the transition region between the tubular region 26 and the perforated tube section 27 are axial stops 22 in the form of varying wall thicknesses. A wall region of the perforated tube section 27 radially adjoins the axial stops so that a sheet-metal element 8 to be inserted therein can be supported radially and axially by means of centering sections 15, 31 which extend radially to the outside from the sheet-metal elements 8. Here, three centering sections 15, 31 per sheet-metal element 8 are provided, wherein one narrow centering section 31 and two wider centering sections 15 are provided. The centering sections 15, 31 fit into guides 4, 32, wherein one guide 32 is narrower than the remaining guides 4, to ensure a unique angular position assignment. Three contact hooks 9 per sheet-metal element 8 initially further extend radially to the outside and then away from the insulating cap 3 in a U- to V-shaped curve in an axial direction, and then lead back towards the insulating cap 3. The contact hooks 9 are designed for a welding joint with a winding wire section 12. In addition, each sheet-metal element 8 is provided with a contact section 20 which is angled away radially from the insulating cap 3. The contact sections 20 of the three sheet-metal elements 8 are arranged to be angularly offset and aligned parallel to each other. In the example shown, the sheet-metal elements 8 are designed as a closed ring. Closed rings also form the insulating elements 10, which are arranged between the sheet-metal elements 8. The insulating members 10 have separating projections 21 extending radially outwards (with no function). The insulating elements 10 must always maintain a secure electrical separation of the sheet-metal elements 8 under all tolerance conditions; therefore, the insulating elements 10 are designed to be wider than the sheet-metal elements 8 to be insulated. The holder 7 consists of an annular region 33 to which three extension arms 17 are radially and axially connected. Recesses 23 are formed on the annular region 33 of the holder 7 in the edge region and are distributed uniformly around the circumference. Each contact hook 9 is assigned a recess 23. A passage 19 which corresponds to axially-projecting connecting means 16 of the insulating cap 3 is provided in the radial end region of the extension arms 17. The connecting means 16 are designed like pins and fit into the passages 19. A small amount of play can simplify the assembly, which can then be compensated for by hot caulking the connecting means 16. An axially-aligned groove 35 is further provided in the extension arms 17 and serves as an opening for the contact sections 20. In the example shown, such a groove 35 is necessary only in one extension arm 17. For reasons of symmetry, all the extension arms 17 are nevertheless provided with a groove 35.

Figure 2:
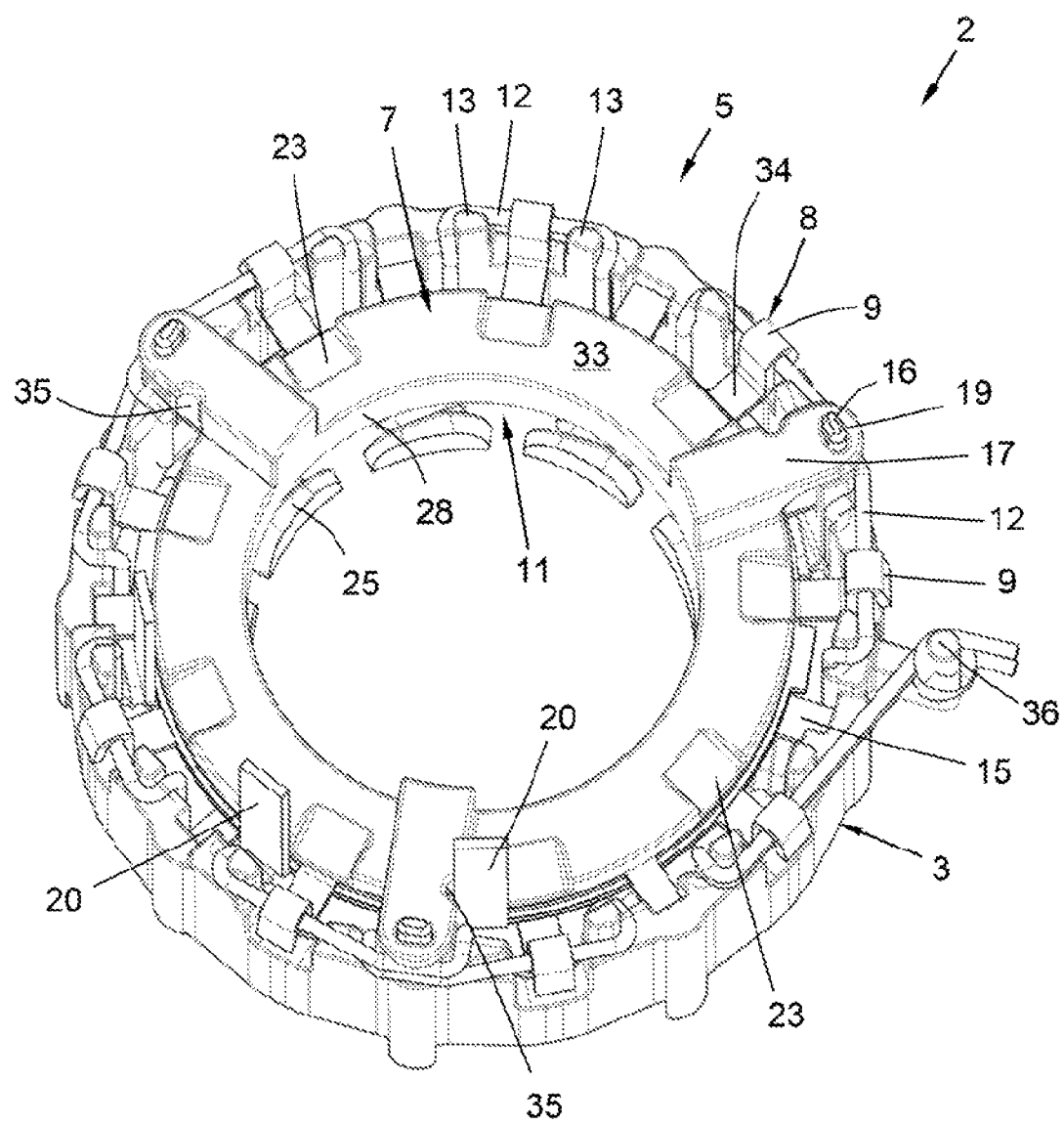
FIG. 2 is an assembled winding interconnection.

FIG. 2 shows the winding interconnection assembly 2 in an assembled state, with the insulating cap 3, the holder 7, sheet-metal elements 8, and winding wire sections 12. The connecting means 16 engage in the passages 19 formed in the extension arms 17. In this case, the connecting means 16 are, however, not yet reshaped, so as to achieve a secure connection. Contact hooks 9 of the sheet-metal elements 8 encompass individual winding wire sections 12. Gaps 14 serve as a receiving space for the contact hooks 9, which, by means of a radial cantilever arm 34 each, are integral with the associated sheet-metal element 8. In order to facilitate access for welding tongs or other tools, the recesses 23, which are inclined in the direction of the contact hooks 9, are provided. Preferably, there is a welding joint between the contact hooks 9 and the winding wire sections 12. In FIG. 2, the welding process has not yet taken place. Pole covers 25 and contact sections 20 of the sheet-metal elements 8 can also be seen. The insulating cap 3 and the holder 7 form a seating area 11 in which the sheet-metal elements 8 and the insulating elements (concealed) are accommodated axially and radially without play. The annular region 33 is on the holder 7 and connects the extension arms 17 to one another, and the inner bead 28 can be seen on its radially inner region, by means of which the sheet-metal elements 8 and the insulating elements (concealed) are protected. In the lower region in FIG. 2, the groove 35 is shown in conjunction with a contact section 20. It can be seen here why the groove 35 with the geometry shown is necessary to be able to use identical sheet-metal elements 8. Finally, an auxiliary pin 36 is shown, which is removed after assembly. It serves for temporarily fixing the winding wire during assembly—in particular, the winding start and winding end.

Figure 3:
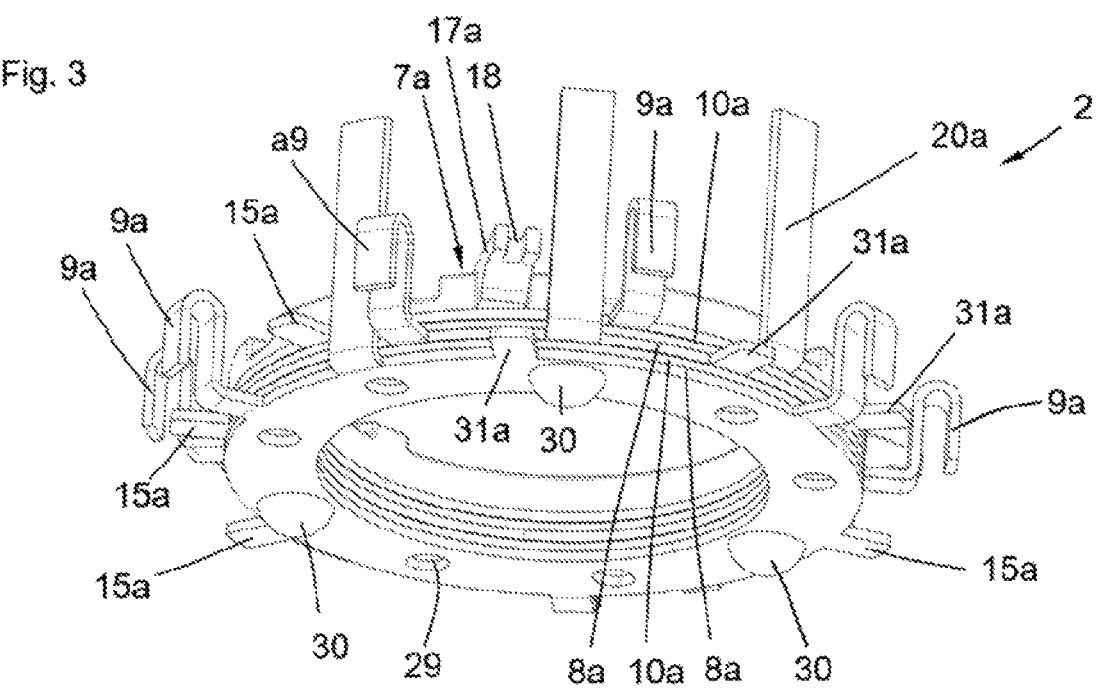
FIG. 3 is a winding interconnection as a pre-assembled assembly.

FIG. 3 shows a pre-assembled winding interconnection assembly 2 with a variant of a holder 7a, a variant of sheet-metal elements 8a, and insulating elements 10a. The sheet-metal elements 8a and the insulating elements 10a have through-holes 29, and the holder 7a has rivet pins. The rivet pins extend through and beyond the through-holes 29 and terminate in the form of a rivet head 30. The rivet heads 30 are formed by hot shaping. The sheet-metal elements 8a and the insulating elements 10a are glued to one another and fixed without play. The adhesive is heat-activatable. The holder 7a has three rivet pins. Because the sheet-metal elements 8a and the insulating elements 10a are identical, but are arranged offset relative to one another, they have nine through-holes 29. In contrast to the embodiment according to FIGS. 1 and 2, the extension arms 17a have radially open recesses 18. The extension arms 17a do not project as far in an axial direction from the holder 7a as the previously described embodiment. Further, each sheet-metal element 8a has three contact hooks 9a, two wide centering sections 15a, one narrow centering section 31a, and one contact section 20a. In this embodiment, the holder 7a has no inner bead, because the sheet-metal elements 8a and the insulating elements 10a are aligned via the rivet pins.

Figure 4:
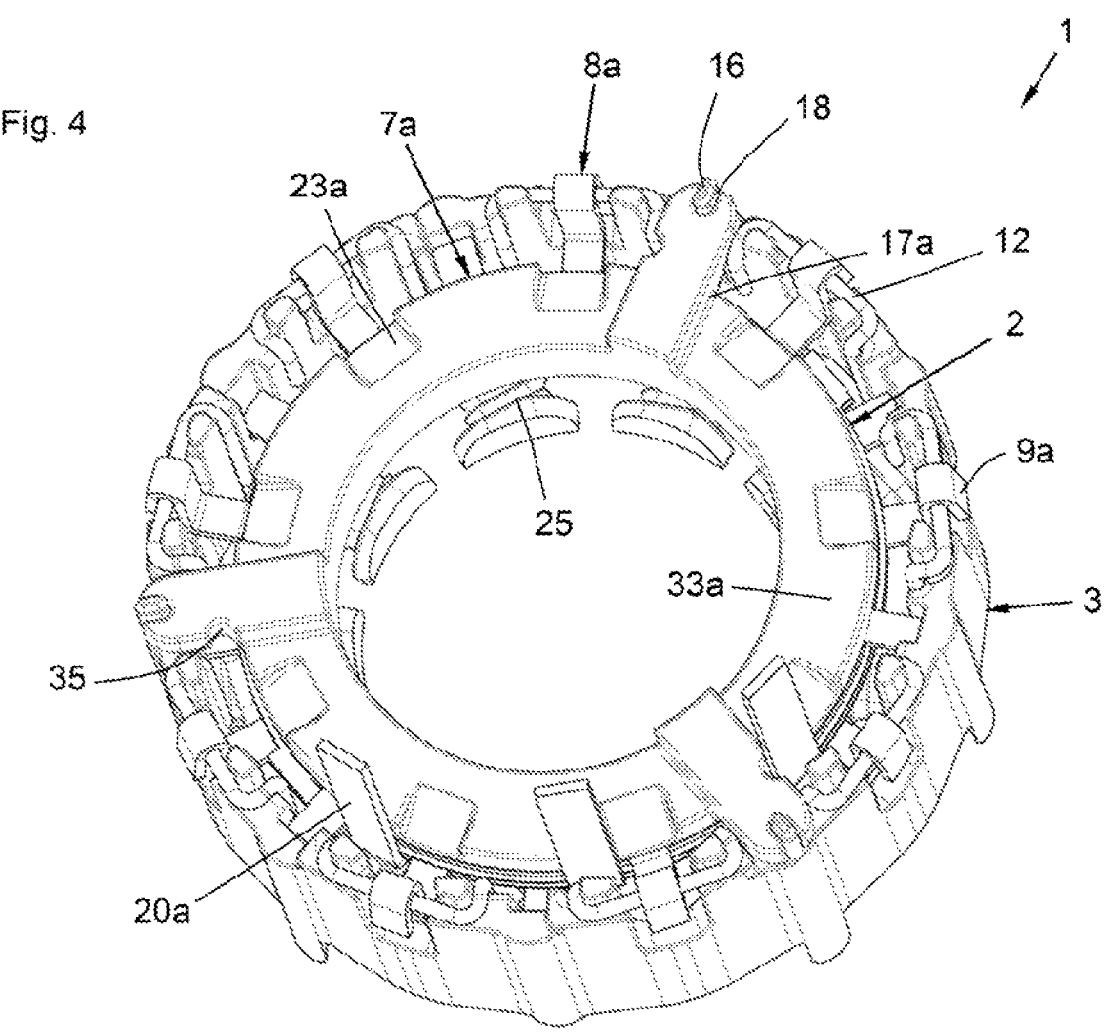
FIG. 4 is a pre-assembled assembly installed on a stator.

FIG. 4 shows the winding interconnection assembly 2 of FIG. 2 in an assembled state, with the insulating cap 3, the holder 7a, the sheet-metal elements 8a, and the winding wire sections 12. The radially open recesses 18 which cooperate with the connecting means 16 are formed at the radial ends of the arms 17a of the holder 7a. Further shown are the groove 35, the contact section 201, the contact hooks 9a, the annular region 33a, and the recesses 23a in the holder 7a and pole covers 25 as a component of the insulator cap 3.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMERALS

1 Partial stator
2 Winding interconnection assembly
3 Insulating cap
4 Wide guide
5 Winding interconnection
6 Insulation
7 Holder
8 Sheet-metal element
9 Contact hook
10 Insulating element
11 Seating area
12 Winding wire section
13 Wire deflection means
14 Gap
15 Wider centering section
16 Connecting means
17 Extension arm
18 Recess
19 Passage
20 Contact section
21 Separating wall
22 Axial stop
23 Cutout
24 Annular disk-shaped region
25 Pole cover
26 Tube-shaped region
27 Perforated tube section
28 Inner bead
29 Through-hole
30 Rivet head
31 Narrow centering section
32 Narrow guide
33 Tube-shaped region
34 Cantilever arm
35 Groove
36 Auxiliary pin

What is claimed is:

1. A stator of an electronically-commutated DC motor, the stator comprising:
   a holder;
   a stator core;
   an insulating cap;
   a stator winding; and
   a winding interconnection, wherein the winding interconnection consists of several sheet-metal elements and several insulating elements arranged between the sheet-metal elements, wherein the sheet-metal elements and the insulating elements are accommodated in a seating area defined between the insulating cap and the holder and are affixed to the insulating cap by the holder;
   centering sections defined on the sheet-metal elements;
   a plurality of guides bordering the seating area, wherein the centering sections of a sheet-metal element are axially supported in the guides bordering the seating area in the insulating cap.

2. The stator according to claim 1, wherein each sheet-metal element includes three centering sections, and one of the three centering sections has a lesser width than the rest.

3. The stator according to claim 2, wherein at least one of the guides receives the centering section with lesser width, the guide being designed to be narrower than the other guides.

4. The stator according to claim 1, wherein the insulating cap (3) has axially-projecting regions each with a wire deflector.

5. The stator according to claim 4, further comprising a clear gap between the wire-deflector in the projecting region of the insulating cap, the gap being bridged by a winding wire section.

6. The stator according to claim 5, wherein the sheet-metal elements have contact hooks which catch winding wire sections of the stator winding during assembly during an axial movement in the direction of the insulating cap.

7. The stator according to claim 5, characterized in that at least one contact hook is welded to a winding wire section.

8. The stator according to claim 7, wherein the welding points of several contact hooks of one phase of the stator are arranged axially at the same axial position.

9. The stator according to claim 1, wherein the insulating cap has connecting means for mechanically connecting the insulating cap to the holder.

10. The stator according to claim 9, characterized in that the holder has radially-extending extension arms which are mechanically connected to the connecting means.

11. The stator according to claim 10, wherein each extension arm has a cutout that is radially open to the outside, or a passage that is closed to the outside.

12. The stator according to claim 10, wherein the connection between the connecting means and the extension arms is produced by hot caulking.

13. The stator according to claim 1, wherein each of the sheet-metal elements are open or closed rings, each of which has a contact section for connection to a power supply.

14. The stator according to claim 1, wherein the insulation elements project radially beyond the sheet-metal elements to the inside and outside.

15. The stator according to claim 1, wherein in the insulating elements have two opposing surfaces and the two opposing surfaces are coated with an adhesive layer.

16. The stator according to claim 1, wherein the holder sits in the seating area so there is no play between the holder, the sheet-metal elements, the insulating elements, and the insulating cap.

17. The stator according to claim 1, wherein, in the insulating cap, axial stops are provided against which at least one sheet-metal element with its centering sections is axially braced.

18. The stator according to claim 1, further comprising axial guides in the insulating cap and wherein the centering sections are joined in the axial guides of the insulating cap.

19. The stator according to claim 1, further comprising contact hooks secured to a sheet-metal element, wherein the holder has several recesses, which are assigned to the contact hooks.

20. The stator according to claim 19, wherein the recesses have inclined surfaces in the direction of the contact hook.

21. The stator according to claim 1, wherein the holder has an inner side and the holder has an inner bead on the inner side.

22. The stator according to claim 1, wherein the sheet-metal elements are identical.

23. The stator according to claim 1, wherein in the insulating elements have two opposing surfaces and the two opposing surfaces are free of any adhesive.

* * * * *